United States Patent
Ansley

(10) Patent No.: US 9,578,367 B2
(45) Date of Patent: Feb. 21, 2017

(54) INTERNET PROTOCOL TELEVISION TUNING ADAPTER

(71) Applicant: ARRIS Enterprises, Inc., Suwanee, GA (US)

(72) Inventor: Carol J. Ansley, Johns Creek, GA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 0 days.

(21) Appl. No.: 14/459,961

(22) Filed: Aug. 14, 2014

(65) Prior Publication Data

US 2015/0052547 A1 Feb. 19, 2015

Related U.S. Application Data

(60) Provisional application No. 61/865,644, filed on Aug. 14, 2013.

(51) Int. Cl.
| | |
|---|---|
| H04N 7/173 | (2011.01) |
| H04N 21/426 | (2011.01) |
| H04N 21/462 | (2011.01) |
| H04N 21/2665 | (2011.01) |
| H04N 21/437 | (2011.01) |
| H04N 21/61 | (2011.01) |
| H04N 21/2343 | (2011.01) |
| H04N 21/4402 | (2011.01) |
| H04N 7/167 | (2011.01) |
| H04N 21/266 | (2011.01) |

(52) U.S. Cl.
CPC ........ *H04N 21/4263* (2013.01); *H04N 7/1675* (2013.01); *H04N 21/2343* (2013.01); *H04N 21/2665* (2013.01); *H04N 21/26606* (2013.01); *H04N 21/42623* (2013.01); *H04N 21/437* (2013.01); *H04N 21/4402* (2013.01); *H04N 21/4622* (2013.01); *H04N 21/6175* (2013.01)

(58) Field of Classification Search
CPC .................. H04N 7/17318; H04N 7/17338
USPC .... 725/91–93, 106–116, 131–134, 139–142, 725/151–153; 709/217–232
See application file for complete search history.

(56) References Cited

U.S. PATENT DOCUMENTS

| | | | | |
|---|---|---|---|---|
| 5,666,487 | A * | 9/1997 | Goodman et al. | 709/246 |
| 7,448,063 | B2 * | 11/2008 | Freeman | G03C 1/26 348/157 |
| 7,716,662 | B2 * | 5/2010 | Seiden | G06F 8/61 717/173 |
| 8,347,341 | B2 * | 1/2013 | Markley | H04L 12/2803 725/80 |
| 8,359,015 | B2 * | 1/2013 | Swaminathan | H04M 3/42195 370/254 |
| 9,197,559 | B1 * | 11/2015 | Cloonan | H04L 47/10 |
| 9,225,762 | B2 * | 12/2015 | Mack | H04L 65/605 |

(Continued)

*Primary Examiner* — Annan Shang
(74) *Attorney, Agent, or Firm* — Bart A. Perkins

(57) ABSTRACT

Methods, systems, and computer readable media can be operable to facilitate the provisioning of data and video services to client devices using communication standards and/or protocols that are not compatible with corresponding CPE device(s). An IPTV adapter can be embedded in a CPE device, can be connected to a CPE device, or can be a stand-alone device, and the tuning adapter can translate/reformat communications between client devices and an upstream component and/or content server. The IPTV adapter can support various communication standards and protocols.

19 Claims, 4 Drawing Sheets

(56) References Cited

U.S. PATENT DOCUMENTS

| | | | | |
|---|---|---|---|---|
| 2002/0002709 | A1* | 1/2002 | An | H04N 7/17309 725/109 |
| 2002/0026645 | A1* | 2/2002 | Son | H04L 12/2801 725/117 |
| 2002/0154892 | A1* | 10/2002 | Hoshen | H04N 7/163 386/213 |
| 2006/0123126 | A1* | 6/2006 | Kim et al. | 709/228 |
| 2007/0094691 | A1* | 4/2007 | Gazdzinski | H04N 7/17318 725/62 |
| 2007/0250900 | A1* | 10/2007 | Marcuvitz | H04L 12/2838 725/141 |
| 2008/0209489 | A1* | 8/2008 | Joyce | H04L 12/2801 725/111 |
| 2008/0282307 | A1* | 11/2008 | McDonald et al. | 725/114 |
| 2009/0028182 | A1* | 1/2009 | Brooks et al. | 370/466 |
| 2009/0270099 | A1* | 10/2009 | Gallagher | H04W 8/08 455/435.1 |
| 2010/0158109 | A1* | 6/2010 | Dahlby | H04N 7/17318 375/240.03 |
| 2011/0307932 | A1* | 12/2011 | Fan | H04N 21/2547 725/110 |
| 2012/0023535 | A1* | 1/2012 | Brooks | H04N 21/222 725/110 |
| 2013/0276022 | A1* | 10/2013 | Tidwell | H04N 21/2547 725/34 |
| 2014/0033241 | A1* | 1/2014 | Valcourt | H04H 60/07 725/14 |
| 2014/0380383 | A1* | 12/2014 | Blanchard | H04L 67/306 725/86 |

* cited by examiner

INTERNET PROTOCOL TELEVISION TUNING ADAPTER

CROSS REFERENCE TO RELATED APPLICATION

This application is a non-provisional application claiming the benefit of U.S. Provisional Application Ser. No. 61/865,644, entitled "Internet Protocol Television Tuning Adapter," which was filed on Aug. 14, 2013, and is incorporated herein by reference in its entirety.

TECHNICAL FIELD

This disclosure relates to providing content to a client device.

BACKGROUND

The advent of networked client devices (e.g., devices that are connected to a common network), such as Digital Living Network Alliance (DLNA) devices, within the home has created a mixture of different interfaces through which subscribers may consume multimedia. Once connected to a network, networked client devices can communicate and interact with each other as well as with customer premise equipment (CPE) devices. In embodiments, CPE devices in a subscriber's home are provided by a multiple system operator (MSO), whereas client devices are not. Client devices, and in some cases, CPE devices, may not be able to recognize or process communications that are delivered using a protocol or standard with which the client devices or CPE devices are unfamiliar.

MSOs offer a variety of services and content to subscribers, and generally, MSOs provide subscribers with CPE devices capable of receiving offered services and content. For example, MSOs may provide subscribers with a set-top box (STB) that can access quadrature amplitude modulation (QAM) video sources through QAM tuners. MSOs may also provide Internet protocol television (IPTV) content to subscribers. IPTV content may include any video content that is delivered to a device at a customer premise over an Internet protocol (IP) infrastructure. However, an STB existing at a customer premise might only have the capability to access video from QAM sources, and might not have an avenue for communicating over an IP infrastructure. When switched digital video (SDV) became available to subscribers, MSOs offered SDV tuning adapters to allow existing STBs to receive content on SDV channels. However, SDV tuning adapters merely serve to guide a STB in tuning to SDV channels, and SDV tuning adapters do not give STBs the ability process IPTV content. Therefore, a need exists for improving methods and systems for delivering video content to subscribers over an IP infrastructure.

BRIEF DESCRIPTION OF THE DRAWINGS

Like reference numbers and designations in the various drawings indicate like elements.

DETAILED DESCRIPTION

It is desirable to improve upon methods and systems for delivering Internet Protocol television (IPTV) content to client devices. Methods, systems, and computer readable media are described herein for facilitating the provisioning of data and video services to client devices using communication standards and/or protocols that are not compatible with corresponding CPE device(s). In embodiments, a CPE device (e.g., set-top box (STB), gateway, etc.) may not have access to content that is requested by a subscriber. For example, a STB that has only QAM tuners to access QAM video sources may not have the inherent capability to access content provided by IPTV servers, such as hypertext transfer protocol live streaming (HLS) servers, accessible over an Internet protocol (IP) connection (e.g., IPTV content). An IPTV tuning adapter can be embedded in a CPE device, can be connected to a CPE device, or can be a stand-alone device, and the IPTV tuning adapter can translate/reformat communications between client devices and an upstream component and/or content server. The IPTV tuning adapter can support various communication standards and protocols to access and distribute IPTV content.

Methods, systems, and computer readable media are described herein for allowing encrypted IPTV traffic to be received by a subscriber without the use of a Cable Card. In embodiments, an IPTV tuning adapter can provide an interface to bridge IPTV traffic to a non-IPTV device, and the IPTV tuning adapter can manage a content delivery package of services. For example, an IPTV tuning adapter can be used with a STB that does not have the inherent capability to access IPTV servers, so that a subscriber can access IPTV content without replacing the STB. An IPTV tuning adapter can allow subscribers using non-MSO CPE units to access MSO-managed IPTV programming. An IPTV tuning adapter can provide both communication of a tuning request, reception of the requested content/programming, and translation of the received content into a format that is compatible with the subscriber's non-MSO unit. The IPTV adapter can also provide a decryption function.

Figure 1:
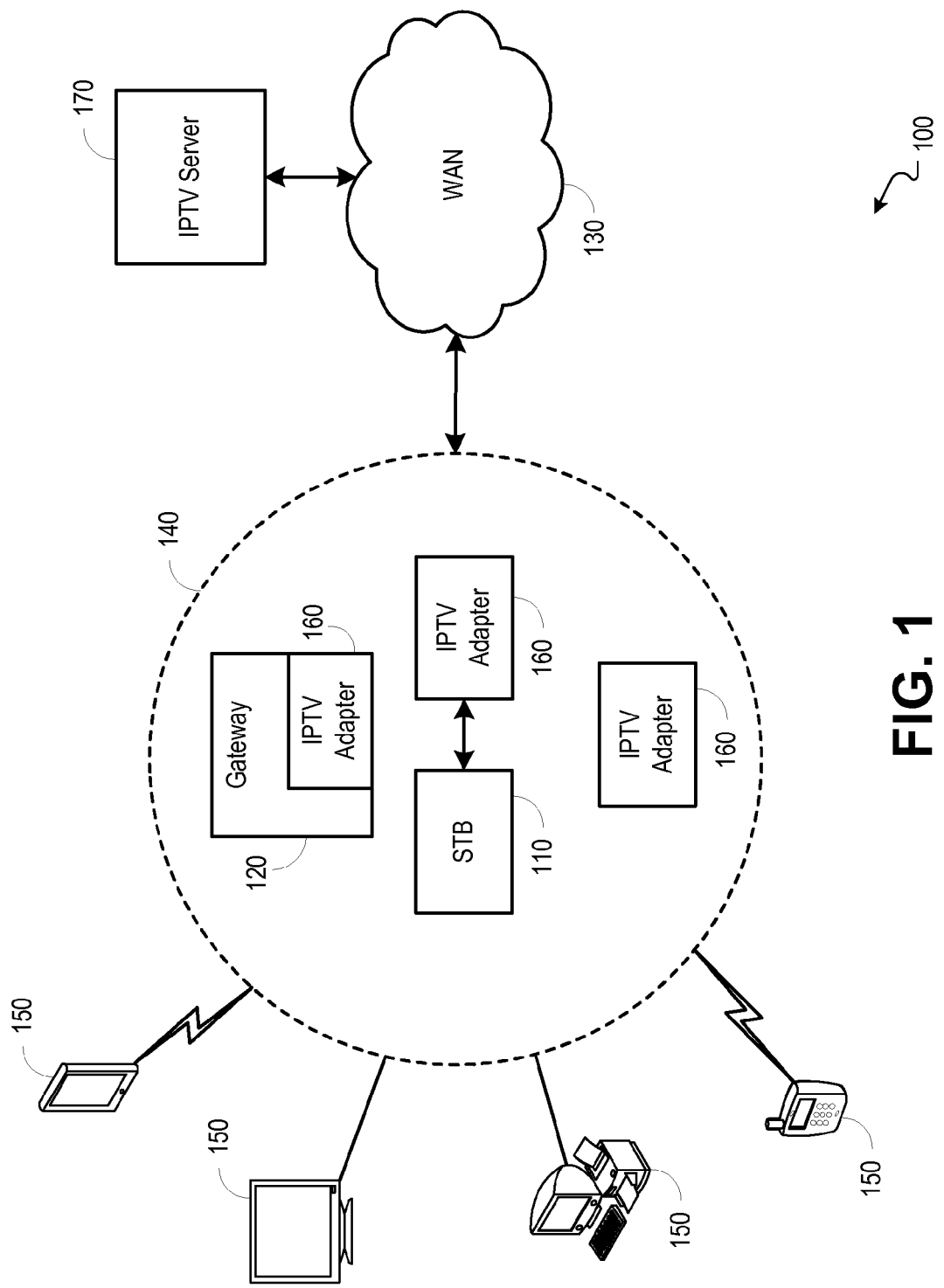
FIG. 1 is a block diagram illustrating an example network environment operable to facilitate the delivery of content to a client device.

FIG. 1 is a block diagram illustrating an example network environment 100 operable to facilitate the delivery of content to a client device. In embodiments, one or more CPE devices (e.g., set-top box (STB) 110, gateway 120, other devices that are not shown such as a broadband modem, a fiber Optical Network Termination Unit/Optical Network Unit (ONT/ONU), a wireless router including an embedded modem, etc.) provide video and/or data services to a subscriber by communicating with a wide area network (WAN) 130 through a connection to a network 140 (e.g., a local area network (LAN), a wireless local area network (WLAN), a personal area network (PAN), optical network, etc.). For example, a subscriber can receive and request video and/or data services through a client device 150 (e.g., computer, tablet, television, mobile device, etc.) through a connection to a CPE device via the network 140. While the components shown in FIG. 1 are shown separate from each other, it should be understood that the various components can be integrated into each other (e.g., the gateway 120 can be integrated into a STB 110).

In embodiments, client devices 150 communicate with each other and with other devices that are connected to the same network 140. For example, client devices 150 can request and receive content from the STB 110 or gateway 120. Client devices 150 can request, from a CPE device, content that is received by the CPE device in a format that the CPE device cannot recognize and/or process. For example, a subscriber can request content using an interface provided by a STB 110. A tuning device (e.g., an IPTV adapter 160) can reformat the requested content such that a corresponding CPE device can recognize and process the content. For example, an IPTV tuning adapter 160 can decrypt content received from the WAN 130 and can either pass the decrypted content to a requesting CPE device or client device 150, or can encrypt the decrypted content into a format that is supported by a corresponding CPE device or requesting client device 150. In embodiments, an IPTV tuning adapter 160 can be embedded in a CPE device (e.g., gateway 120), can be installed with and connected to a CPE device (e.g., STB 110), or can be a stand-alone device operable to receive content requests from client devices 150, retrieve requested content from the WAN 130, reformat the retrieved content, and output the reformatted content to the requesting client device 150.

In embodiments, the format of communications between the IPTV tuning adapter 160 and the CPE devices or client devices 150 can be any one of many open standards. For example, a digital interface for an IPTV tuning adapter 160 may include a Digital Living Network Alliance (DLNA) interface using digital transmission content protection over internet protocol (DTCP-IP) to protect the content until it reaches the requesting client device 150. In embodiments, the IPTV tuning adapter 160 may include a broadband data modem such as a cable modem or a digital subscriber line (DSL) modem.

In embodiments, when a content request is received by a host device (e.g., CPE device such as a STB 110), and the host device does not have access to the specific requested content, the host device can output the request for the content to an IPTV tuning adapter 160. For example, the host device might have access to a first content delivery platform (e.g., QAM), but the requested content might only be available through a second content delivery platform (e.g., IPTV), wherein the host device is not configured to retrieve content from the second content delivery platform. Content delivered by the first content delivery platform and content delivered by the second content delivery platform may be delivered in different formats. The IPTV tuning adapter 160 can output the content request to an upstream server (e.g., IPTV server 170), and the upstream server can send the requested content along with any other relevant information to the IPTV tuning adapter 160. The IPTV tuning adapter 160 can reformat and forward the requested content and other information, if needed, before sending the requested content and other information to the CPE device that received the original content request. Other information may include program metadata, a service identifier (e.g., DOCSIS multicast downstream service identifier (DSID)) as well as other relevant program information.

In embodiments, a stand-alone IPTV tuning adapter 160 may include a digital media server (DMS) (e.g., DLNA DMS), one or more Ethernet or wireless interfaces that connect directly or indirectly to the network 140, a gateway and/or a cable modem). The stand-alone IPTV tuning adapter 160 can receive content requests (e.g., DLNA requests) from the client devices 150, and negotiate with an upstream server (e.g., IPTV server 170) to acquire the requested content. The stand-alone IPTV adapter 160 can receive the requested content and can perform appropriate content protection actions, such as decryption of the content from the IPTV server. For example, the IPTV tuning adapter 160 can remove the encryption associated with the Wide Area Network's Digital Rights Management. In embodiments, the stand-alone IPTV tuning adapter 160 can encrypt the decrypted content, for example, to a format that is supported by the requesting client device 150, and can send the encrypted content to the requesting client device 150. For example, when the client device 150 is a DLNA Digital Media Player device, the IPTV tuning adapter 160 can encrypt the content using DTCP-IP and send it on to the client device. In embodiments, the stand-alone IPTV tuning adapter 160 can further comprise an embedded cable modem. It should be understood that any broadband data service can be used by the stand-alone IPTV tuning adapter 160 to communicate its requests to the WAN 130.

Figure 2:
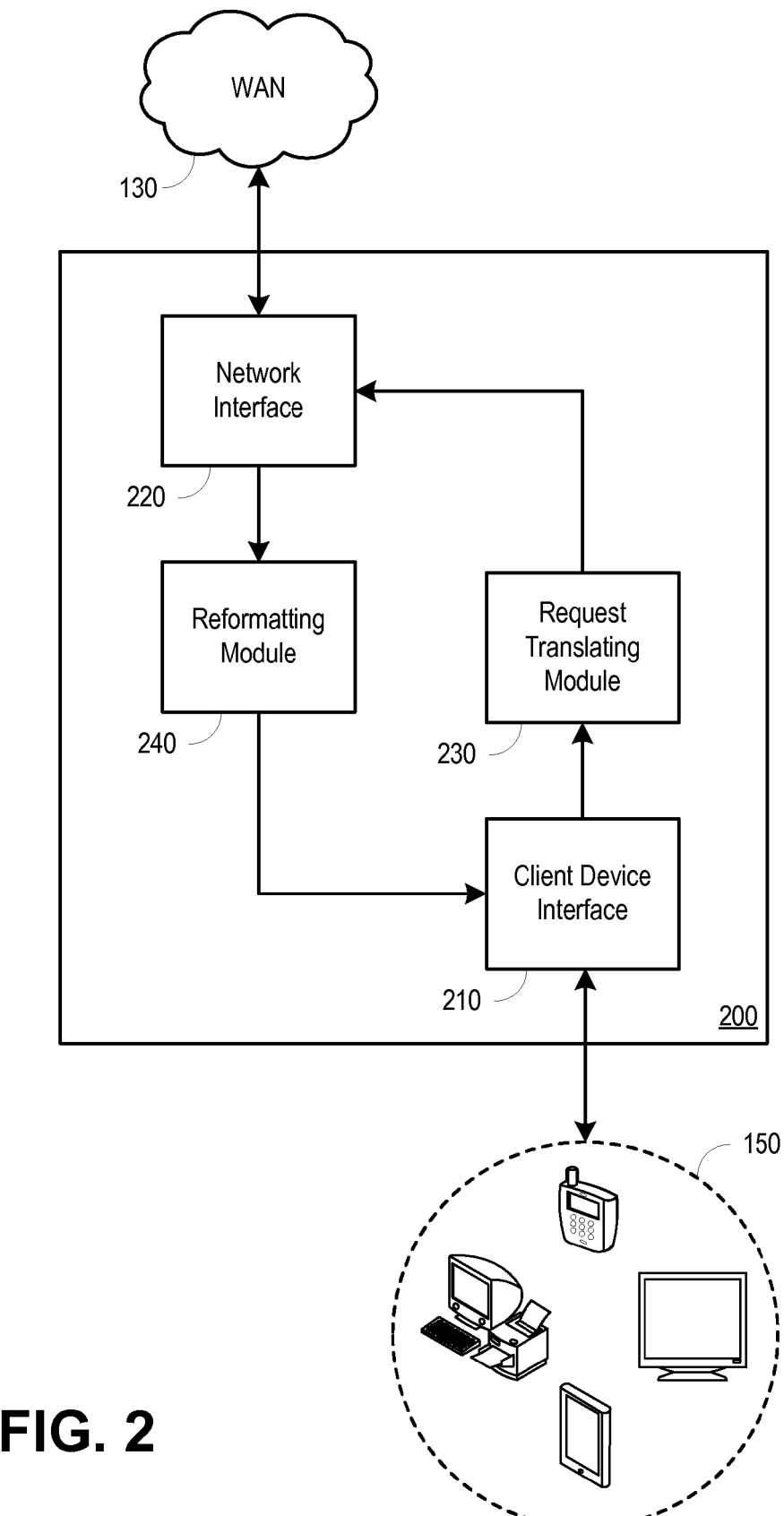
FIG. 2 is a block diagram illustrating an example component operable to facilitate the delivery of content to a client device.

FIG. 2 is a block diagram illustrating an example component 200 operable to facilitate the delivery of content to a client device. The component 200 can include a client device interface 210, a network interface 220, a request translating module 230, and a reformatting module 240. In embodiments, the component 200 is within an IPTV tuning adapter 160 of FIG. 1.

In embodiments, the component 200 can receive a request for content from a CPE device or client device 150 through the client device interface 210. The CPE devices or client devices 150 from which content requests are received may support various, different communication formats. The client device interface 210 can be operable to accept different forms of content requests. In embodiments, a content request received at the component 200 is a request for content that is stored at an upstream server (e.g., IPTV server 170 of FIG. 1). For example, the requested content can be content that is not accessible by a CPE device over standard QAM delivery methods.

In embodiments, a content request is passed from the client device interface 210 to the request translating module 230. In embodiments, the request translating module 230 can determine whether the content request can be sent upstream in the format it is in when received by the component 200. If the content request can be sent upstream, the request translating module 230 can encrypt the content request, if necessary, for delivery and can output the content request upstream to the WAN 130 via the network interface 220. If the content request is not compatible with an upstream component (e.g., IPTV server 170 of FIG. 1) in its current format (e.g., the naming convention of content may differ between a subscriber request and the content as stored in a server), the request translating module 230 can translate the content request into a more compatible format, can encrypt the content request, if necessary, for delivery, and can output the content through the network interface 220. An IPTV adapter 160 can determine whether a requesting client device or CPE device is authorized to access the requested content, and can grant or deny the request accordingly.

In embodiments, the request translating module 230 can determine whether a content request can be recognized or processed by a corresponding CPE device (e.g., STB 110 of FIG. 1, gateway 120 of FIG. 1, etc.). If necessary, the request translating module 230 can translate the content request into a format that can be recognized and/or processed by the corresponding CPE device. The network interface 220 can provide an IP connection for the component 200.

In embodiments, the reformatting module 240 can receive requested content from the WAN 130 via the network interface 220. The content can be received over an IP connection. The reformatting module 240 can translate the content into a format that is compatible with the requesting CPE device or client device 150. For example, the reformatting module 240 can format the content such that the content has resolution, codec, bitrate, frame rate, and other properties that are compatible with the requesting device. The reformatting module 240 can remove another digital rights management (DRM) encryption and re-encrypt the requested content using DTCP-IP to protect the content during delivery of the content to a requesting DLNA device.

In embodiments, a CPE device or client device 150 can inform an IPTV adapter 160 as to the format or properties that the requested content is to have upon delivery of the content to the requesting device. For example, the content request can include an identification of a format and/or various properties that the delivered content should have. In embodiments, an IPTV adapter 160 may include a table associating various types of devices with formats and/or properties that are compatible with each device. When the IPTV adapter 160 receives a request for content, the request for content can inform the IPTV adapter 160 of one or more devices (e.g., CPE devices and/or client devices 150) that are to receive the requested content. The IPTV adapter 160 can then locate the one or more devices in the table and can format the requested content according to the formats and/or properties associated with the devices in the table.

In embodiments, the reformatting module 240 can recognize a security encryption associated with the requested content. The reformatting module 240 can decrypt the security encryption (e.g., Wide Area Network's Digital Rights Management encryption), reformat the content, if necessary, such that the content is compatible with the requesting client device 150, and reapply the security encryption to the reformatted content. In embodiments, the component 200 can comprise or have access to one or more keys associated with various encryption schemes, and the reformatting module 240 can use the one or more keys to recognize, decrypt, and re-encrypt security encryptions associated with requested content.

In embodiments, requested content can be output to a requesting CPE device or client device 150 through the client device interface 210. For example, the content can be sent to a CPE device or client device 150 over a DLNA connection. In embodiments, a requesting CPE device (e.g., STB 110 of FIG. 1) may route the content received from the IPTV tuning adapter 160 to a display, to storage (e.g., digital video recorder (DVR), personal video recorder (PVR), etc.), and/or to a client device 150 requesting the content from the CPE device. The requested content can be output to the requesting client device 150 in a format that is compatible with the client device. In embodiments, the network interface 220 and the client device interface 210 may be the same physical interface or different physical interfaces.

Figure 3:
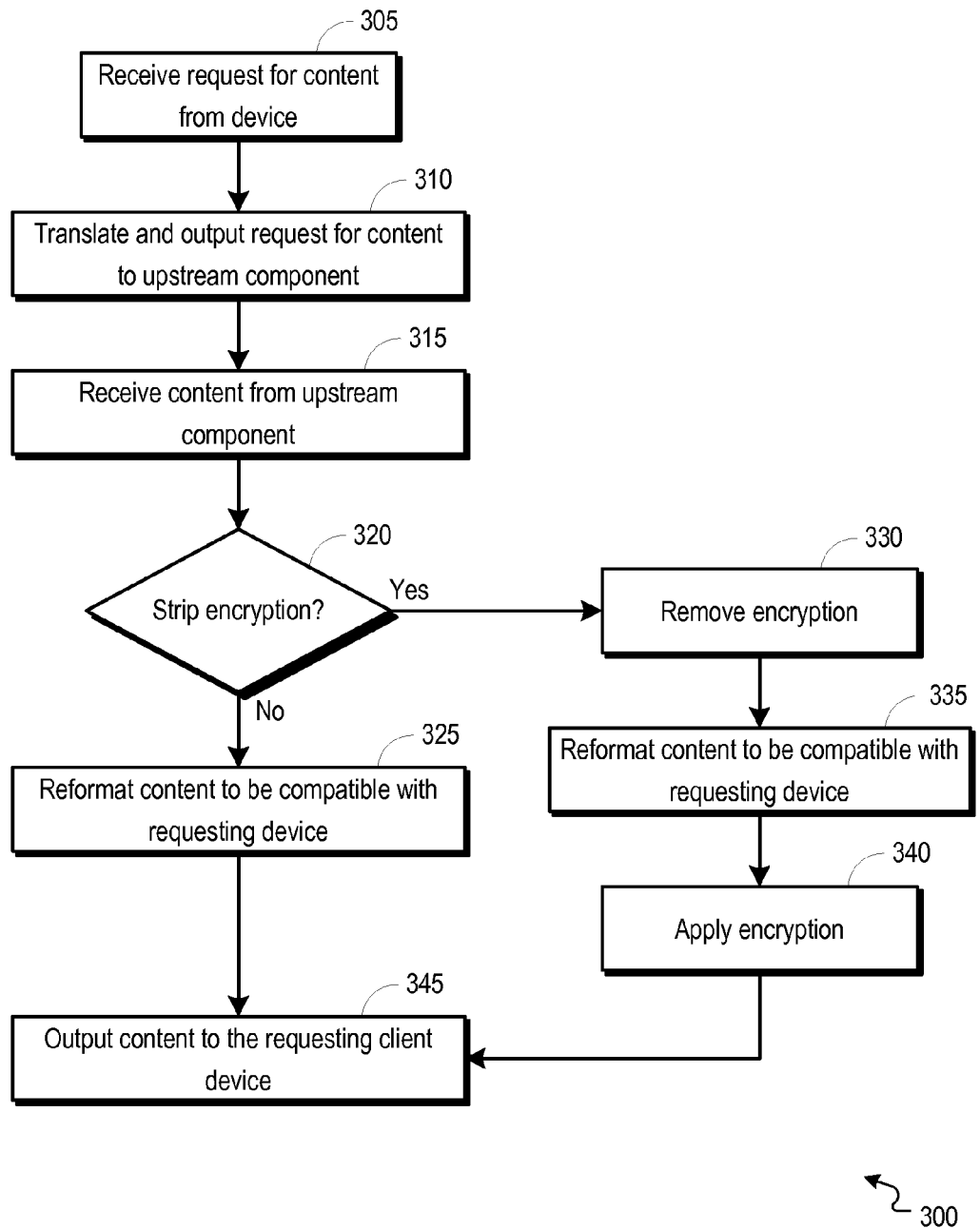
FIG. 3 is a flowchart illustrating an example process operable to facilitate the delivery of content to a client device.

FIG. 3 is a flowchart illustrating an example process 300 operable to facilitate the delivery of content to a client device. The process 300 can begin at 305, when a request for content is received from a device (e.g., CPE device or client device 150 of FIG. 1). For example, an IPTV tuning adapter 160 of FIG. 1 can receive a request for content from a device connected to a network 140 of FIG. 1 (e.g., from a client device 150 of FIG. 1, gateway 120 of FIG. 1, STB 110 of FIG. 1, etc.). In embodiments, a subscriber can select content from a STB user interface (e.g., program guide) and the STB can output a request for the selected content to an IPTV tuning adapter 160. For example, when the selected content is only available through a content delivery platform (e.g., QAM, IPTV, etc.) that is unavailable to the STB 110, the STB 110 can output a content request to an IPTV tuning adapter 160 over a DLNA interface. The content request may include formatting information (e.g., formats and/or encoding parameters at which to deliver the requested content to the STB) and/or information identifying a client device 150 that is requesting the content. For example, the IPTV tuning adapter 160 can determine formats and/or encoding parameters at which to deliver the requested content based upon the type of client device 150 that is requesting the content.

At 310, the content request can be translated and output to an upstream component. The content request can be translated, for example by the request translating module 230 of FIG. 2, and can be output through the network interface 210 of FIG. 2. In embodiments, the content request can be translated into a format that is compatible with a corresponding server (e.g., IPTV Server 170 of FIG. 1, etc.). In embodiments, the content request can be output to an upstream server (e.g., IPTV server 170 of FIG. 1) wherein the corresponding content is located or stored.

At 315, requested content can be retrieved from the upstream component. In embodiments, the requested content is received at an IPTV tuning adapter 160 of FIG. 1. The requested content can arrive at the IPTV tuning adapter 160 in one of a variety of formats, protocols, and/or encryption techniques. In embodiments, the IPTV tuning adapter 160 can receive tuning information ahead of the requested content. For example, the tuning information may inform the IPTV tuning adapter 160 whether the requesting subscriber has permission to access the requested content, and may further include information for tuning to, receiving, and/or decrypting the requested content.

At 320, a determination can be made whether an encryption associated with the received content should be stripped. In embodiments, when the received content is not encrypted with a security encryption or is otherwise capable of being reformatted to be compatible with the requesting device, without the removal of an encryption, the process 300 can proceed to 325. In embodiments, when the received content is encrypted with a security encryption, or other encryption that must be removed before reformatting the underlying content, the process 300 can proceed 330.

At 330, the encryption can be removed from the received content. The received content can be decrypted, for example, by the reformatting module 240 of FIG. 2. In embodiments, the component 200 can comprise or have access to one or more keys associated with various encryption schemes (e.g., Wide Area Network's Digital Rights Management encryption), and the reformatting module 240 can use the one or more keys to recognize and decrypt an encryption associated with requested content.

At 335, and likewise at 325, the received content can be reformatted such that it is compatible with the requesting client device. The content can be reformatted, for example, by the reformatting module 240 of FIG. 2. In embodiments, the reformatting module 240 can reformat the requested content according to what format(s) are compatible with a requesting client device 150 of FIG. 1 and/or a corresponding CPE device (e.g., STB 110 of FIG. 1, gateway 120 of FIG. 1, etc.). For example, the reformatting module 240 can transcode the requested content to be compatible with the codecs or video resolutions supported by the requesting device.

At 340, an encryption associated with the received content can be applied to the content. The received content can be re-encrypted, for example, by the reformatting module 240 of FIG. 2. In embodiments, the reformatting module 240 can use a key associated with the encryption scheme to encrypt the content such that the requesting client device 150 of FIG. 1 can process the content.

At 345, the reformatted content can be output to the requesting CPE device or client device. In embodiments an IPTV tuning adapter 160 of FIG. 1 can output the reformatted content to a requesting client device 150 of FIG. 1 and/or a CPE device (e.g., STB 110 of FIG. 1, gateway 120 of FIG. 1, etc.). For example, the IPTV tuning adapter 160 can output the formatted content to a STB 110 over a DLNA interface.

Figure 4:
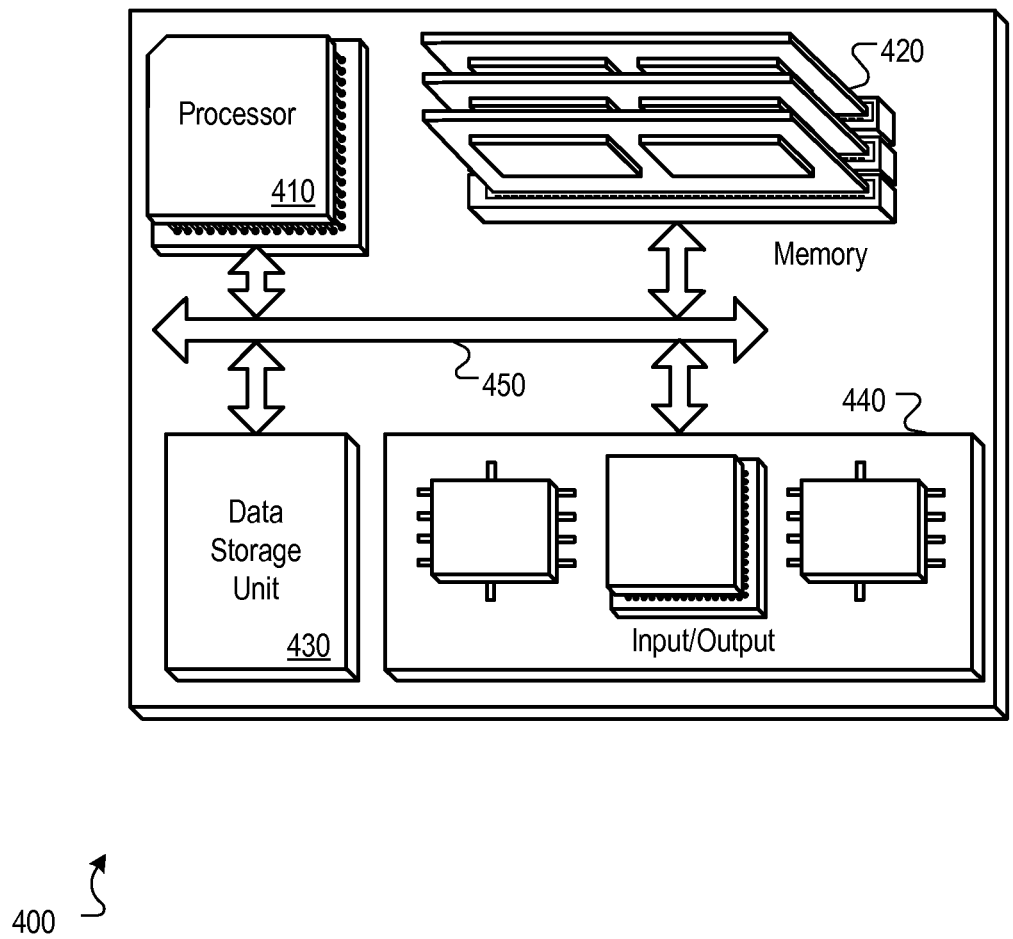
FIG. 4 is a block diagram of a hardware configuration operable to facilitate the delivery of content to a client device.

FIG. 4 is a block diagram of a hardware configuration 400 operable to facilitate the delivery of content to a client device. The hardware configuration 400 can include a processor 410, a memory 420, a storage device 430, and an input/output device 440. Each of the components 410, 420, 430, and 440 can, for example, be interconnected using a system bus 450. The processor 410 can be capable of processing instructions for execution within the hardware configuration 400. In one implementation, the processor 410 can be a single-threaded processor. In another implementation, the processor 410 can be a multi-threaded processor. The processor 410 can be capable of processing instructions stored in the memory 420 or on the storage device 430.

The memory 420 can store information within the hardware configuration 400. In one implementation, the memory 420 can be a computer-readable medium. In one implementation, the memory 420 can be a volatile memory unit. In another implementation, the memory 420 can be a non-volatile memory unit.

In some implementations, the storage device 430 can be capable of providing mass storage for the hardware configuration 400. In one implementation, the storage device 430 can be a computer-readable medium. In various different implementations, the storage device 430 can, for example, include a hard disk device, an optical disk device, flash memory or some other large capacity storage device. In other implementations, the storage device 430 can be a device external to the hardware configuration 400.

The input/output device 440 provides input/output operations for the hardware configuration 400. In embodiments, the input/output device 440 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a client device 150 of FIG. 1 (e.g, television, computer, tablet, mobile device, etc.) and/or a CPE device (e.g., STB 110 of FIG. 1, gateway 120 of FIG. 1, etc.). In embodiments, the input/output device can include driver devices configured to send communications to, and receive communications from one or more networks (e.g., network 140 of FIG. 1, WAN 130 of FIG. 1, etc.).

Those skilled in the art will appreciate that the invention improves upon methods and systems for delivering content to client devices. The methods, systems, and apparatuses described in this disclosure enable the provisioning of data and video services to client devices using communication standards and/or protocols that are not compatible with corresponding CPE device(s). An IPTV tuning adapter can be embedded in a CPE device, can be connected to a CPE device, or can be a stand-alone device, and the tuning adapter can translate communications between client devices and an upstream component and/or content server. The IPTV adapter can support various communication standards and protocols.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

I claim:

1. A method comprising:
   receiving at an adapter a request for video content, the request for video content being received from a host device configured to request content to be received by the host device through a first content delivery platform, the first content delivery platform comprising a quadrature amplitude modulation (QAM) content delivery platform, wherein the video content is available for delivery over a second content delivery platform, the second content delivery platform comprising an Internet protocol television (IPTV) content delivery platform, and the host device is without an interface configured to retrieve the video content over the second content delivery platform;
   retrieving the requested video content at the adapter, wherein the adapter is located within a premise associated with the host device, and the video content is delivered to the adapter from an upstream server over the second content delivery platform;
   determining, at the adapter, that the host device is without an interface configured to retrieve the video content over the second content delivery platform;
   formatting the retrieved video content according to a format that is compatible with the first content delivery platform; and
   outputting the formatted video content to the host device, wherein the formatted video content is delivered to the host device over the first content delivery platform;
   wherein the second content delivery platform delivers content in a different format than the first content delivery platform.

2. The method of claim 1, wherein the host device is a set-top box.

3. The method of claim 2, wherein the adapter is connected to the set-top box over a Digital Living Network Alliance interface.

4. The method of claim 1, further comprising:
   identifying a client device requesting the video content through the host device, wherein the client device is identified based upon information in the request for video content received at the adapter;
   determining encoding parameters compatible with the identified client device; and
   encoding the retrieved video content according to the encoding parameters.

5. The method of claim 1, further comprising:
   recognizing an encryption associated with the retrieved video content;
   before formatting the retrieved video content, decrypting the retrieved video content; and
   after formatting the retrieved video content, encrypting the formatted video content.

6. The method of claim 5, wherein a key associated with the recognized encryption is stored on the adapter.

7. The method of claim 1, further comprising:
   translating the request for video content into a format that is compatible with an upstream component; and
   outputting the translated request for video content to the upstream component.

8. The method of claim 1, wherein the request for video content comprises one or more Digital Living Network Alliance protocol messages.

9. The method of claim 1, wherein the request for video content is provided by the host device by a first request received from a user interacting with a user interface associated with the host device for requesting content from the first content delivery format.

10. An adapter located within a premise, wherein the adapter comprises:
    a first interface configured to be used to receive a request for video content, the request for video content being received from a host device configured to request content to be received by the host device through a first content delivery platform, the first content delivery platform comprising a quadrature amplitude modulation (QAM) content delivery platform, wherein the video content is available for delivery over a second content delivery platform, the second content delivery platform comprising an Internet protocol television (IPTV) content delivery platform, and the host device is without an interface configured to retrieve the video content over the second content delivery platform;
    a second interface configured to be used to retrieve the requested video content from an upstream server over the second content delivery platform;
    a module configured to determine that the host device is without an interface configured to retrieve the video content over the second content delivery platform and reformat the retrieved video content according to a format that is compatible with the first content delivery platform; and
    wherein the first interface is further configured to be used to output the reformatted video content to the host device over the first content delivery platform;
    wherein the second content delivery platform delivers content in a different format than the first content delivery platform.

11. The apparatus of claim 10, further comprising:
a module configured to translate the request for video content into a format that is compatible with an upstream component; and
an interface configured to be used to output the translated request for video content to the upstream component.

12. The apparatus of claim 10, further comprising a module configured to:
recognize an encryption associated with the retrieved video content;
before the retrieved video content is formatted, decrypt the retrieved video content; and
after the retrieved video content is formatted, encrypt the formatted video content.

13. The apparatus of claim 10, further comprising:
storage for a table associating one or more types of devices with various formats and encoding properties compatible with each of the device types; and
wherein the module is further configured to identify a client device requesting the video content within the table, and to reformat the received video content according to the formats and encoding properties compatible with the device requesting the video content.

14. The apparatus of claim 13, wherein the type of device from which the request for the video content is received is identified from within the request for the video content.

15. One or more non-transitory computer readable media having instructions operable to cause one or more processors to perform the operations comprising:
receiving at an adapter a request for video content, the request for video content being received from a host device configured to request content to be received by the host device through a first content delivery platform, the first content delivery platform comprising a quadrature amplitude modulation (QAM) content delivery platform, wherein the video content is available for delivery over a second content delivery platform, the second content delivery platform comprising an Internet protocol television (IPTV) content delivery platform, and the host device is without an interface configured to retrieve the video content over the second content delivery platform;
retrieving the requested video content at the adapter, wherein the adapter is located within a premise associated with the host device, and the video content is delivered to the adapter from an upstream server over the second content delivery platform;
determining, at the adapter, that the host device is without an interface configured to retrieve the video content over the second content delivery platform;
formatting the retrieved video content according to a format that is compatible with the first content delivery platform; and
outputting the formatted video content to the host device, wherein the formatted video content is delivered to the host device over the first content delivery platform;
wherein the second content delivery platform delivers content in a different format than the first content delivery platform.

16. The one or more non-transitory computer-readable media of claim 15, wherein the adapter is integrated in the host device.

17. The one or more non-transitory computer-readable media of claim 15, wherein the instructions are further operable to cause one or more processors to perform the operations comprising:
recognizing an encryption associated with the retrieved video content;
before formatting the retrieved video content, decrypting the retrieved video content; and
after formatting the retrieved video content, encrypting the formatted video content.

18. The one or more non-transitory computer-readable media of claim 15, wherein the requested video content comprises Internet protocol television content.

19. The one or more non-transitory computer-readable media of claim 15, wherein the instructions are further operable to cause one or more processors to perform the operations comprising:
translating the request for content into a format that is compatible with an upstream component; and
outputting the translated request for content to the upstream component.

* * * * *